United States Patent
Takenouchi et al.

(10) Patent No.: US 9,627,658 B2
(45) Date of Patent: Apr. 18, 2017

(54) BATTERY AND BATTERY PACK

(71) Applicant: Kabushiki Kaisha Toshiba, Minato-ku (JP)

(72) Inventors: Yoshio Takenouchi, Saku (JP); Kenichi Takahashi, Saku (JP); Mitsugi Ogura, Machida (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 211 days.

(21) Appl. No.: 14/481,232

(22) Filed: Sep. 9, 2014

(65) Prior Publication Data

US 2014/0377640 A1    Dec. 25, 2014

Related U.S. Application Data

(63) Continuation of application No. PCT/JP2012/056421, filed on Mar. 13, 2012.

(51) Int. Cl.
*H01M 2/06* (2006.01)
*H01M 2/02* (2006.01)
*H01M 2/08* (2006.01)
*H01M 2/36* (2006.01)
*H01M 2/26* (2006.01)
(Continued)

(52) U.S. Cl.
CPC ............ *H01M 2/024* (2013.01); *H01M 2/06* (2013.01); *H01M 2/08* (2013.01); *H01M 2/26* (2013.01); *H01M 2/362* (2013.01); *H01M 2/365* (2013.01); *H01M 10/0413* (2013.01); *H01M 2/043* (2013.01); *H01M 2/0473* (2013.01); *H01M 2/263* (2013.01); *H01M 10/0431* (2013.01);
(Continued)

(58) Field of Classification Search
CPC ........ H01M 2/024; H01M 2/26; H01M 2/263; H01M 2/08; H01M 2/0473
USPC ........................................................ 429/179
See application file for complete search history.

(56) References Cited

U.S. PATENT DOCUMENTS

2008/0160393 A1\* 7/2008 Kim ..................... H01M 2/08
429/94
2009/0130552 A1    5/2009 Kim

FOREIGN PATENT DOCUMENTS

CN        101626088 A       1/2010
JP        2005-158649 A     6/2005
(Continued)

OTHER PUBLICATIONS

International Preliminary Report on Patentability with Written Opinion issued Sep. 25, 2014, in International Application No. PCT/JP2012/056421.
(Continued)

*Primary Examiner* — Basia Ridley
*Assistant Examiner* — James Erwin
(74) *Attorney, Agent, or Firm* — Oblon, McClelland, Maier & Neustadt, L.L.P.

(57) ABSTRACT

According to one embodiment, a battery includes a container, an electrode group, an electrolytic solution, a sealing plate, a terminal, an injecting port, a sealing plug, a lead and a pressing member. The injecting port is opened in the sealing plate. The sealing plug closes the injecting port of the sealing plate, and is made of an elastic material. The lead electrically connects a positive electrode or a negative electrode of the electrode group to the terminal. The pressing member is integrated with the lead. The pressing member presses the sealing plug to the sealing plate.

6 Claims, 9 Drawing Sheets

(51) Int. Cl.
*H01M 10/04* (2006.01)
*H01M 10/0525* (2010.01)
*H01M 2/04* (2006.01)
*H01M 10/0587* (2010.01)

(52) U.S. Cl.
CPC .... *H01M 10/0525* (2013.01); *H01M 10/0587* (2013.01); *H01M 2220/20* (2013.01)

(56) References Cited

FOREIGN PATENT DOCUMENTS

| | | |
|---|---|---|
| JP | 2006-302809 A | 11/2006 |
| JP | 2006-331828 A | 12/2006 |
| JP | 2007-059145 A | 3/2007 |
| JP | 2011-86382 A | 4/2011 |
| JP | 2012-49039 A | 3/2012 |
| WO | WO 2012/023434 A1 | 2/2012 |

OTHER PUBLICATIONS

Combined Office Action and Search Report issued on Dec. 21, 2015 in Chinese Patent Application No. 201280071358.2 with English translation.
International Search Report mailed Jun. 12, 2012 for PCT/JP2012/056421 filed on Mar. 13, 2012 with English Translation.
International Written Opinion mailed Jun. 12, 2012 for PCT/JP2012/056421 filed on Mar. 13, 2012.
Extended European Search Report issued Oct. 19, 2015 in Patent Application No. 12871473.0.

\* cited by examiner

BATTERY AND BATTERY PACK

CROSS-REFERENCE TO RELATED APPLICATIONS

This application is a Continuation Application of PCT Application No. PCT/JP2012/056421, filed Mar. 13, 2012, the entire contents of which are incorporated herein by reference.

FIELD

Embodiments described herein relate to a battery and a battery pack.

BACKGROUND

In recent years, a rectangular parallelepiped chargeable/dischargeable nonaqueous electrolyte battery, for example, a lithium ion battery has been mainly used for a power supply of an electric vehicle such as a hybrid electric vehicle or a plug-in electric vehicle which has spread rapidly. The lithium ion battery includes a rectangular parallelepiped case, and an electrode group and a nonaqueous electrolytic solution provided in the rectangular parallelepiped case. The electrode group includes a positive electrode and a negative electrode wound or laminated with a separator sandwiched therebetween. The case is made of aluminum or an aluminium alloy.

After the case is decompressed in the manufacturing process of the lithium ion battery, an electrolytic solution is injected. However, when the amount of the electrolytic solution to be injected is more than a void volume in the case, a long time is required before the electrode group is impregnated with the electrolytic solution to guide the whole amount of the electrolytic solution into the case.

DETAILED DESCRIPTION

According to one embodiment, a battery includes: a container; an electrode group; an electrolytic solution; a sealing plate; a terminal; an injecting port; a sealing plug; a lead; and a pressing member. The electrode group is provided in the container. The electrode group includes a positive electrode and a negative electrode. The electrolytic solution is provided in the container. The sealing plate is provided in an opening part of the container. The terminal is provided on the sealing plate. The injecting port is opened in the sealing plate. The sealing plug closes the injecting port of the sealing plate. The sealing plug is made of an elastic material. The lead electrically connects the positive electrode or the negative electrode of the electrode group to the terminal. The pressing member is integrated with the lead. The pressing member presses the sealing plug to the sealing plate.

Hereinafter, embodiments will be described with reference to the drawings.

First Embodiment

Figure 1:
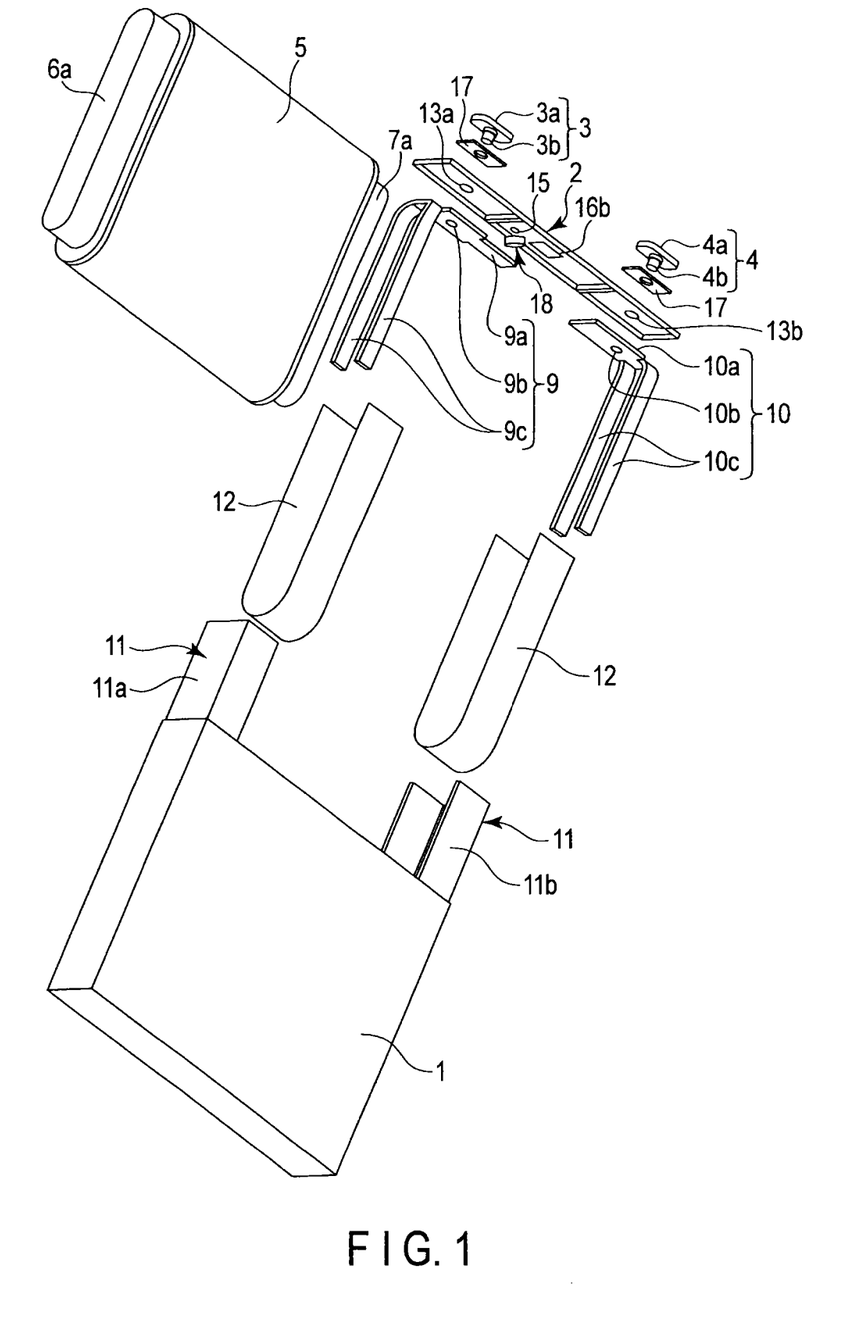
FIG. 1 is an exploded perspective view showing a state of a battery according to a first embodiment before injecting.
Figure 2:
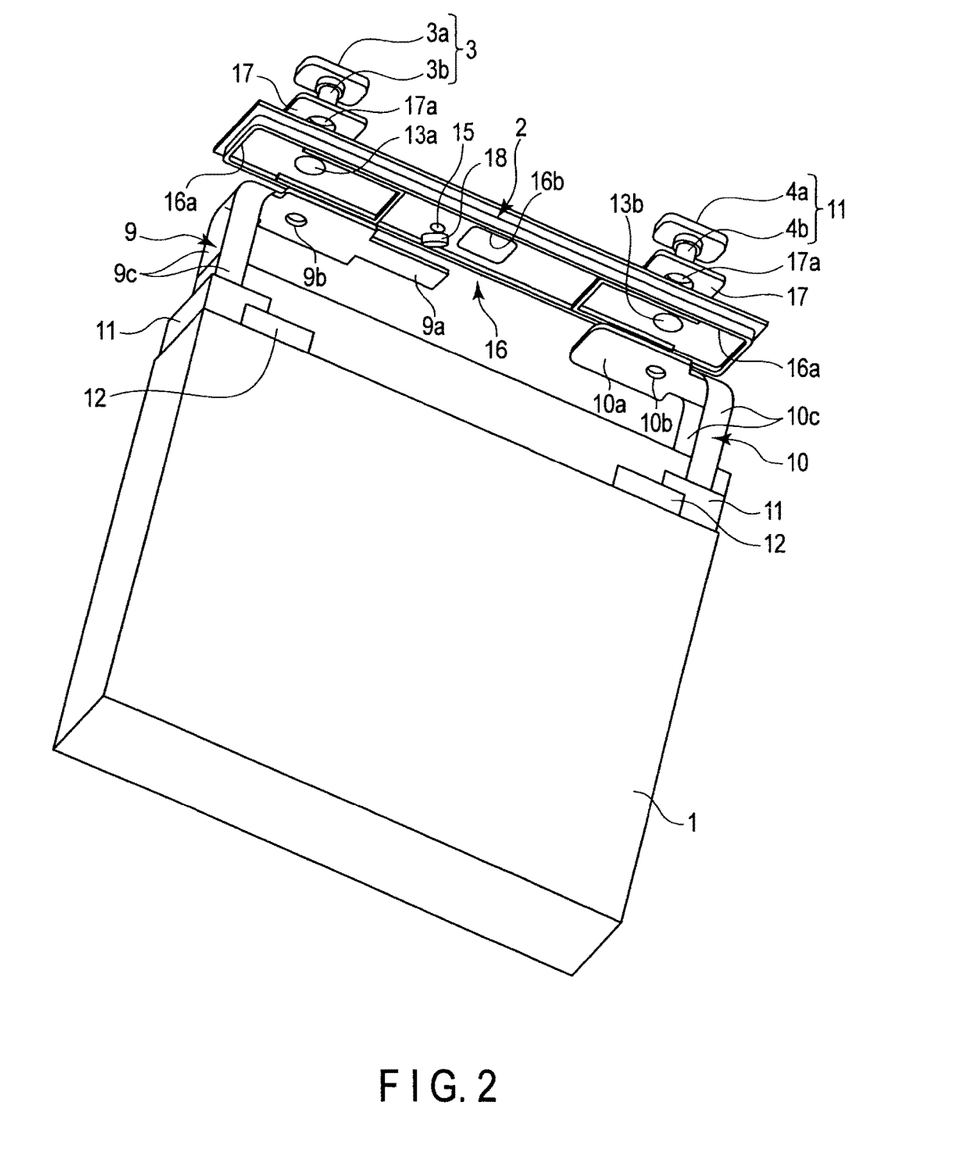
FIG. 2 is a partial exploded perspective view of the battery shown in FIG. 1, as viewed from below.

A battery shown in FIG. 1 is a prismatic sealed nonaqueous electrolyte battery before an injecting process. The battery has an outer can 1 as a container, a sealing plate 2 attached to an opening part of the outer can 1, and a positive electrode terminal 3 and a negative electrode terminal 4 provided on the sealing plate 2. The outer can 1 has a bottomed square shape. As shown in FIGS. 1 and 2, a flat-type electrode group 5 is provided in the outer can 1. An electrolytic solution (not shown) is accommodated in the outer can 1. The flat-type electrode group 5 is impregnated with the electrolytic solution.

Figure 3:
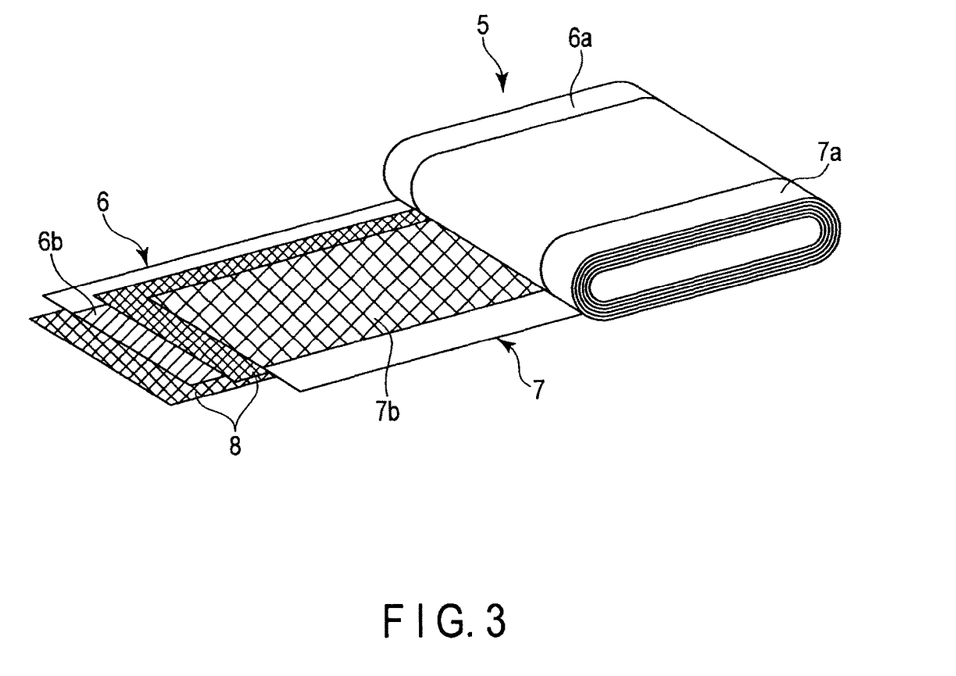
FIG. 3 is a partial exploded perspective view of an electrode group used in the battery shown in FIG. 1.

As shown in FIG. 3, the flat-type electrode group 5 is obtained by winding a positive electrode 6 and a negative electrode 7 in a flat shape with a separator 8 sandwiched therebetween. The positive electrode 6 includes a strip-shaped positive electrode collector, a positive electrode current collecting tab 6a, and a positive electrode active material layer 6b. The strip-shaped positive electrode collector includes a metallic foil, for example. The positive electrode current collecting tab 6a includes one end part of the positive electrode collector, and the end part is parallel to a long side of the positive electrode collector. The positive electrode active material layer 6b is formed on the positive electrode collector except for at least a portion of the positive electrode current collecting tab 6a. On the other hand, the negative electrode 7 includes a strip-shaped negative electrode collector, a negative electrode current collecting tab 7a, and a negative electrode active material layer 7b. The strip-shaped negative electrode collector includes a metallic foil, for example. The negative electrode current collecting tab 7a includes one end part of the negative electrode collector, and the one end part is parallel to a long side of the negative electrode collector. The negative electrode active material layer 7b is formed on the negative electrode collector except for at least a portion of the negative electrode current collecting tab 7a.

The positive electrode 6, the separator 8, and the negative electrode 7 are wound with the positive electrode 6 and the negative electrode 7 positionally deviated such that the positive electrode current collecting tab 6a is projected from the separator 8 in a winding axial direction of the electrode group and a negative electrode current collecting tab 7a is projected from the separator 8 in a direction opposite to the positive electrode current collecting tab 6a. As shown in FIG. 3, in the electrode group 5 obtained by the winding, the spirally wound positive electrode current collecting tab 6a is projected from one end face, and the spirally wound negative electrode current collecting tab 7a is projected from the other end face.

As shown in FIGS. 1 and 2, a positive electrode lead 9 has a connecting plate 9a, a through-hole 9b, and strip-shaped collecting parts 9c. The connecting plate 9a is configured to electrically connect the positive electrode lead 9 to a positive electrode terminal 3. The through-hole 9b is opened in the connecting plate 9a. The strip-shaped collecting parts 9c bifurcate from the connecting plate 9a and extend downward. The collecting parts 9c of the positive electrode lead 9 are electrically connected to the positive electrode current collecting tab 6a by welding with the positive electrode current collecting tab 6a of the electrode group 5 sandwiched between the collecting parts 9c. On the other hand, a negative electrode lead 10 has a connecting plate 10a, a through-hole 10b, and strip-shaped collecting parts 10c. The connecting plate 10a is configured to electrically connect the negative electrode lead 10 to the negative electrode terminal 4. The through-hole 10b is opened in the connecting plate 10a. The strip-shaped collecting parts 10c bifurcate from the connecting plate 10a and extend downward. The collecting parts 10c of the negative electrode lead 10 are electrically connected to the negative electrode current collecting tab 7a by welding with the negative electrode current collecting tab 7a of the electrode group 5 sandwiched between the collecting parts 10c. A method for electrically connecting the positive and negative electrode leads 9 and 10 to the positive and negative electrode current collecting tabs 6a and 7a is not particularly limited. Examples of the method include welding such as ultrasonic welding or laser welding.

An electrode guard 11 has a side plate 11a and a side plate 11b. The side plate 11a covers the end face of each of the positive and negative electrode current collecting tabs 6a and 7a. The side plate 11b is curved in a U shape so as to cover the outermost circumference of each of the positive and negative electrode current collecting tabs 6a and 7a. The upper end of the electrode guard 11 is opened since the electrode group 5 is inserted from the upper end. The positive electrode current collecting tab 6a of the electrode group 5 and the collecting parts 9c of the positive electrode lead 9 welded to the positive electrode current collecting tab 6a are covered with the electrode guard 11. The connecting plate 9a of the positive electrode lead 9 is located above the electrode guard 11. On the other hand, the negative electrode current collecting tab 7a of the electrode group 5 and the collecting parts 10c of the negative electrode lead 10 welded to the negative electrode current collecting tab 7a are covered with the electrode guard 11. The connecting plate 10a of the negative electrode lead 10 is located above the electrode guard 11. The two electrode guards 11 are fixed to the electrode group 5 by an insulating tape 12.

Figure 8:
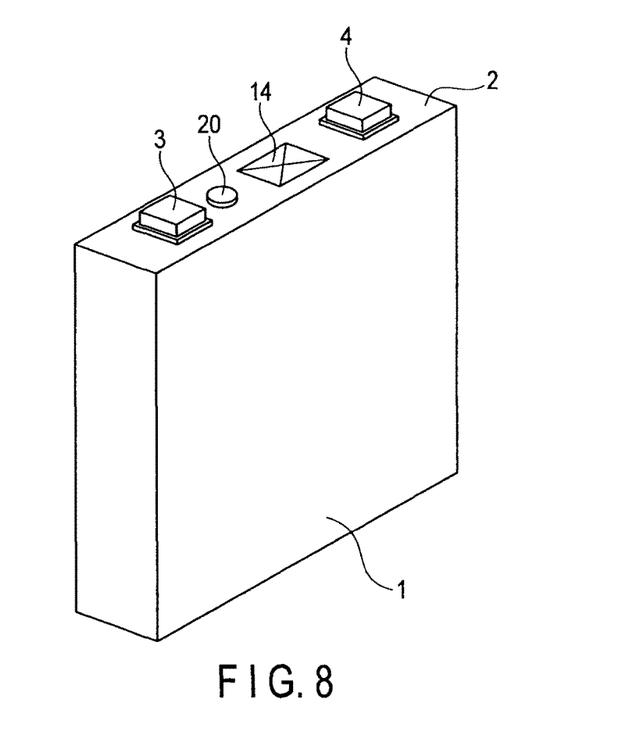
FIG. 8 is a perspective view of the battery according to the first embodiment.

As shown in FIGS. 1, 2, and 8, the sealing plate 2 has a rectangular plate shape. The sealing plate 2 has through-holes 13a and 13b, a safety valve 14, and an injecting port 15. The positive and negative electrode terminals 3 and 4 are attached to the through-holes 13a and 13b. The safety valve 14 is located near the center of the sealing plate 2. The injecting port 15 is located between the through-hole 13a and the safety valve 14. An insulating plate 16 has two recessed parts 16a. The insulating plate 16 has through-holes communicated with the through-holes 13a and 13b of the sealing plate 2, a gas vent hole 16b opened at a position facing the safety valve 14, and a through-hole communicated with the injecting port 15 of the sealing plate 2. The insulating plate 16 is disposed on the back face of the sealing plate 2. The one recessed part 16a of the insulating plate 16 is brought into contact with the connecting plate 9a of the positive electrode lead 9. The connecting plate 10a of the negative electrode lead 10 is provided in the other recessed part 16a.

Figure 4:
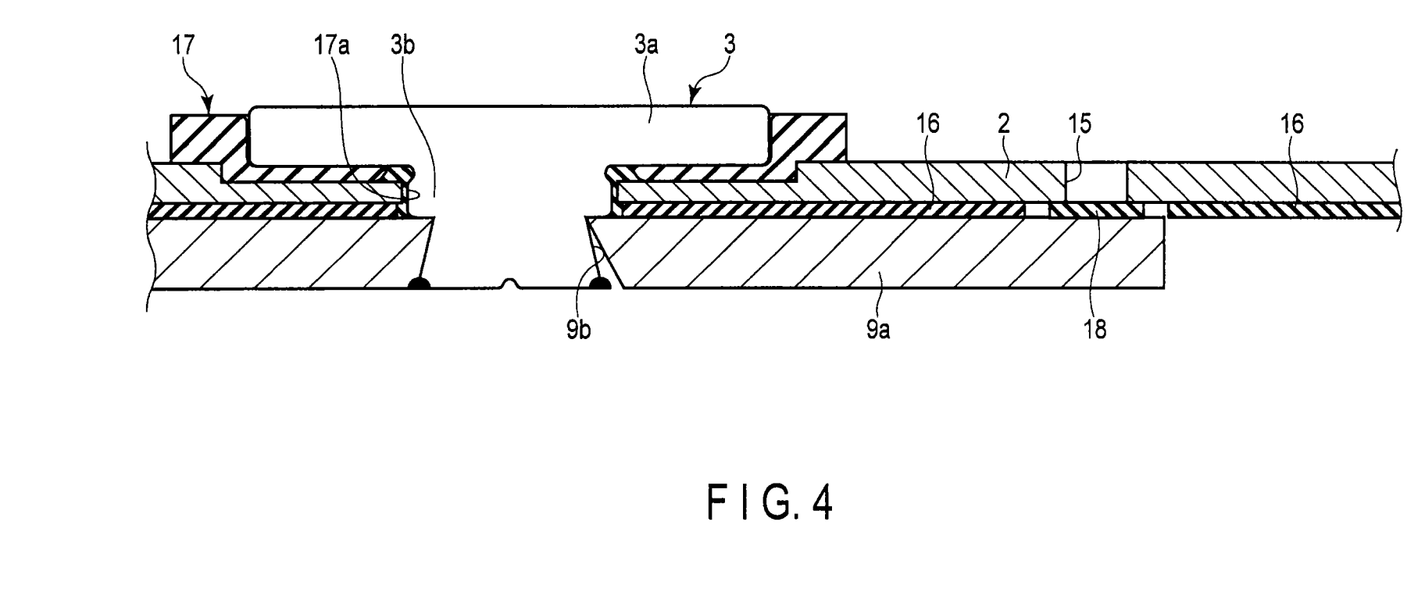
FIG. 4 is a sectional view of a positive electrode terminal, a sealing plate, and a positive electrode lead of the battery shown in FIG. 1.

The positive electrode terminal 3 has a projection part 3a having a rectangular plate shape, and an axis part 3b extending from the projection part 3a. The negative electrode terminal 4 has a projection part 4a having a rectangular plate shape, and an axis part 4b extending from the projection part 4a. An insulating gasket 17 has through-holes 17a into which the axis parts 3b and 4b of the positive electrode terminal 3 and the negative electrode terminal 4 are inserted. As shown in FIG. 4, the axis part 3b of the positive electrode terminal 3 is inserted into the through-hole 17a of the insulating gasket 17, the through-hole 13a of the sealing plate 2, the through-hole of the insulating plate 16, and the through-hole 9b of the connecting plate 9a of the positive electrode lead 9. The axis part 3b is caulked and fixed on these members. Thereby, the positive electrode terminal 3 is electrically connected to the positive electrode current collecting tab 6a via the positive electrode lead 9. On the other hand, the axis part 4b of the negative electrode terminal 4 is inserted into the through-hole 17a of the insulating gasket 17, the through-hole 13b of the sealing plate 2, the through-hole of the insulating plate 16, and the through-hole 10b of the connecting plate 10a of the negative electrode lead 10. The axis part 4b is caulked and fixed on these members. Thereby, the negative electrode terminal 4 is electrically connected to the negative electrode current collecting tab 7a via the negative electrode lead 10.

Figure 6:
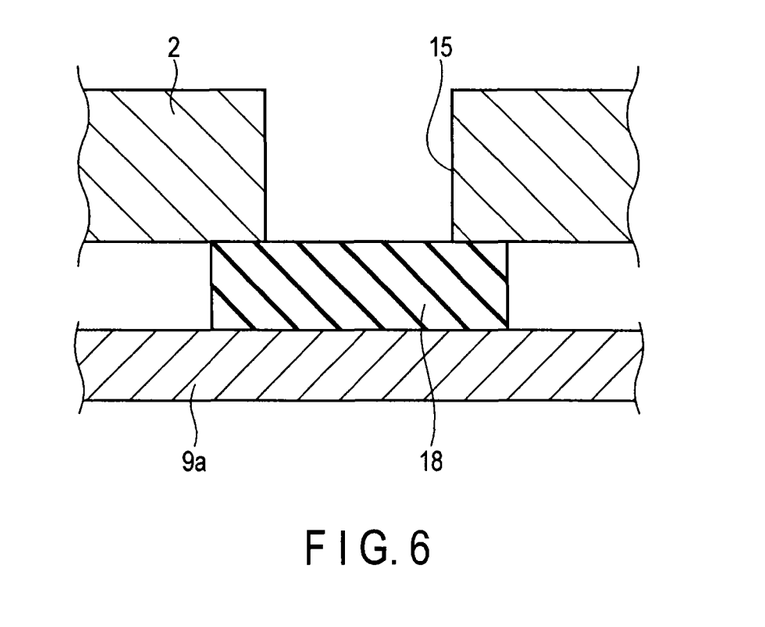
FIG. 6 is a sectional view near an injecting port of the battery shown in FIG. 1.

As shown in FIGS. 1 and 2, a sealing plug 18 has a cylindrical column shape. The sealing plug 18 is made of an elastic material. The elastic material preferably has electrolytic solution resistance. Examples of the elastic material include EPDM rubber. The shape of the sealing plug 18 is not limited to the cylindrical column shape. The shape can be changed according to the shape of the injecting port 15. As shown in FIGS. 4 and 6, the sealing plug 18 is on the back face of the sealing plate 2, and closes the injecting port 15 from the back face of the sealing plate 2. The tip portion of the connecting plate 9a of the positive electrode lead 9 presses the sealing plug 18 toward the sealing plate 2, with the sealing plug 18 sandwiched between the tip portion and the sealing plate 2. That is, the tip portion of the connecting plate 9a of the positive electrode lead 9 functions as a pressing member configured to press the sealing plug 18 to the sealing plate 2. A member obtained by extending the lead may be used for the pressing member. A pressing member made of a metal having electrolytic solution resistance such as an aluminium alloy and stainless steel can be also combined with the lead. The positive electrode lead 9 and the negative electrode lead 10 can be made of aluminum and an aluminium alloy, for example. The member obtained by extending the lead can be made of aluminum and an aluminium alloy, for example.

Herein, a positive electrode active material, a negative electrode active material, a separator, a nonaqueous electrolytic solution, a container, a sealing plate, and an electrode guard will be described.

The positive electrode active material is not particularly limited. Examples of the positive electrode active material include various oxides, for example, a lithium-containing cobalt oxide (for example, $LiCoO_2$), manganese dioxide, a lithium manganese composite oxide (for example, $LiMn_2O_4$, $LiMnO_2$), a lithium-containing nickel oxide (for example, $LiNiO_2$), a lithium-containing nickel cobalt oxide (for example, $LiNi_{0.8}CO_{0.2}O_2$), a lithium-containing iron oxide, a lithium-containing vanadium oxide, and a chalcogen compound such as titanium disulfide or molybdenum disulfide.

The negative electrode active material is not particularly limited. Examples of the negative electrode active material include a graphitized material or a carbonaceous material (for example, graphite, coke, a carbon fiber, spherical carbon, a vapor phase thermal decomposition carbonaceous material, or a resin fired body or the like), a chalcogen compound (for example, titanium disulfide, molybdenum disulfide, or niobium selenide or the like), a light metal (for example, aluminum, an aluminium alloy, a magnesium alloy, lithium, or a lithium alloy or the like), and a lithium titanium oxide (for example, spinel type lithium titanate).

The separator is not particularly limited. For example, a fine porous membrane, a woven fabric, and a nonwoven fabric, and a laminated body of the same materials or different materials of these, or the like can be used. Examples of a material forming the separator include polyethylene, polypropylene, an ethylene-propylene copolymer, an ethylene-butene copolymer, and cellulose.

The nonaqueous electrolytic solution is prepared by dissolving an electrolyte (for example, a lithium salt) in a nonaqueous solvent. Examples of the nonaqueous solvent include ethylene carbonate (EC), propylene carbonate (PC), butylene carbonate (BC), dimethyl carbonate (DMC), diethyl carbonate (DEC), ethyl methyl carbonate (EMC), γ-butyrolactone (γ-BL), sulfolane, acetonitrile, 1,2-dimethoxyethane, 1,3-dimethoxypropane, dimenthyl ether, tetrahydrofuran (THF), and 2-methyltetrahydrofuran. The nonaqueous solvents may be used either alone or in the form of a mixture of two or more types. Examples of the electrolyte include a lithium salt such as lithium perchlorate ($LiClO_4$), lithium hexafluorophosphate ($LiPF_6$), lithium tetrafluoroborate ($LiBF_4$), lithium hexafluoroarsenide ($LiAsF_6$), or lithium trifluoromethanesulfonate ($LiCF_3SO_3$). The electrolytes may be used either alone or in the form of a mixture of two or more types. The amount of the electrolyte to be dissolved in the nonaqueous solvent is desirably set to 0.2 mol/L to 3 mol/L. When the concentration of the electrolyte is too low, sufficient ion conductivity cannot be occasionally obtained. On the other hand, when the concentration is too high, occasionally, the electrolyte cannot be completely dissolved in the electrolytic solution.

For example, aluminum, an aluminium alloy, iron (Fe), iron subjected to nickel (Ni) plating, or stainless steel (SUS) or the like can be used for a material for the container and the sealing plate. When the positive electrode terminal 3 and the negative electrode terminal 4 are made of aluminum or an aluminium alloy, the aluminum or the aluminium alloy can be used for the positive electrode lead 9 and the negative electrode lead 10.

Any resins can be used for the electrode guard as long as the resins cannot be easily corroded by the electrolytic solution. For example, polyethylene, polypropylene, an ethylene vinyl acetate copolymer, an ethylene vinyl acetate alcohol copolymer, an ethylene-acrylic acid copolymer, an ethylene-ethyl acrylate copolymer, an ethylene-methyl acrylate copolymer, an ethylene-methacrylic acrylate copolymer, an ethylene-methyl methacrylate copolymer, an ionomer, polyacrylonitrile, polyvinylidene chloride, polytetrafluoroethylene, polychlorotrifluoroethylene, polyphenylene ether, polyethylene terephthalate, or polytetrafluoroethylene or the like can be used. The resins may be used either alone or in the form of a mixture of two or more types. Of these, polypropylene or polyethylene is preferably used.

Figure 7:
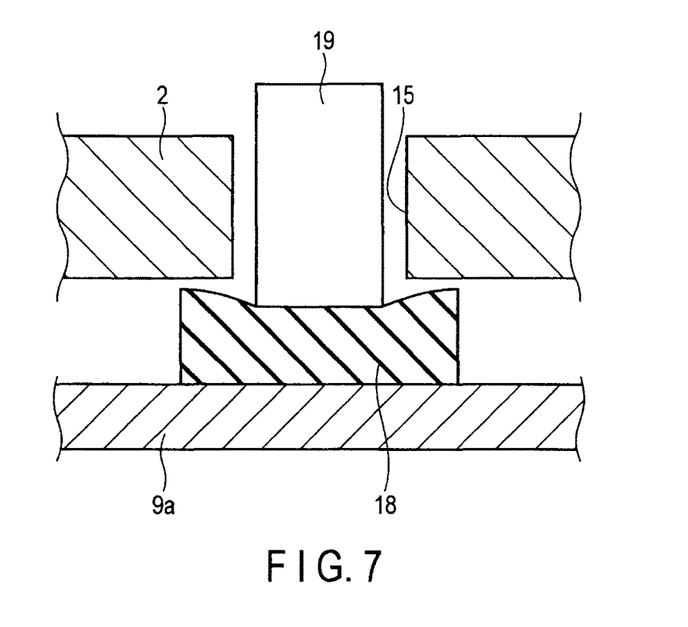
FIG. 7 is a sectional view near the injecting port having a state where an operation pin is operated in the battery shown in FIG. 1.

As shown in FIG. 6, in the structure described above, the sealing plug 18 made of an elastic material is disposed between the injecting port 15 of the sealing plate 2 and the connecting plate 9a of the positive electrode lead 9. When the nonaqueous electrolytic solution is injected, an operation pin 19 is inserted from the injecting port 15. The sealing plug 18 is pressed down by the operation pin 19, to form a clearance between the circumference of the injecting port 15 and the sealing plug 18. In this state, an injecting nozzle is inserted into the injecting port 15. When the nonaqueous electrolytic solution is injected while a pressure is applied from the injecting nozzle, the container is swollen by the pressurization to increase a void volume in the container. Thereby, the impregnation of the nonaqueous electrolytic solution to the electrode group 5 can be promoted. That is, since pressurization injecting can be performed using the swollenness of the container, the whole amount of the electrolytic solution can be injected in a short time. Since the container can be sealed while a pressurization state in the container is maintained when the operation pin 19 is then pulled up, the blowback of the electrolytic solution when the injecting nozzle is removed from the injecting port can be prevented, and the electrolytic solution can be injected in a short time.

When the electrolytic solution is injected in a pressurization state in a structure having no sealing plug, and the injecting nozzle is removed from the injecting port before the electrode group is impregnated with the electrolytic solution, the blowback of the electrolytic solution is generated by a pressure difference between inside and outside of the container.

As shown in FIG. 8, it is desirable that after injecting, a disk-shaped sealing lid 20 is fixed to the surface of the sealing plate 2 by welding, and the injecting port 15 is closed by the sealing lid 20. Thereby, since the injecting port 15 is sealed by the sealing plug 18 and the sealing lid 20, the airtightness of the battery can be enhanced. The sealing lid 20 can be made of aluminum, an aluminium alloy, iron (Fe), iron subjected to nickel (Ni) plating, stainless steel (SUS) or the like, for example.

Figure 5:
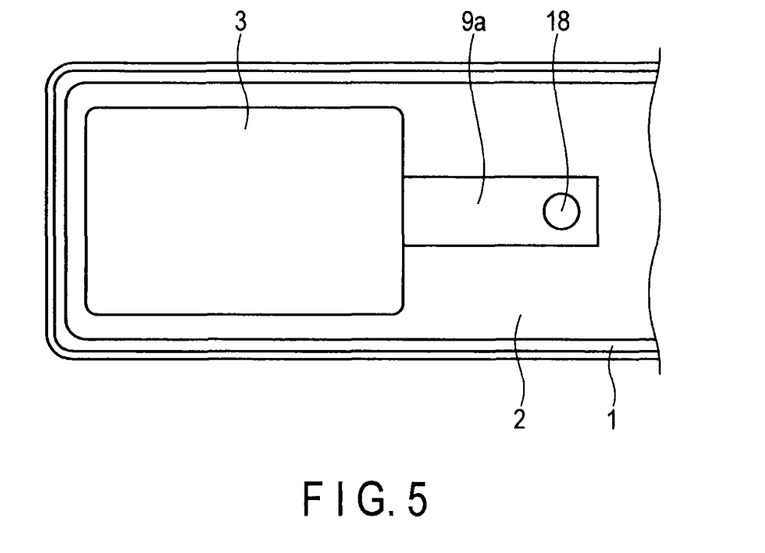
FIG. 5 is a transparent view of the battery shown in FIG. 1 from above.
Figure 9:
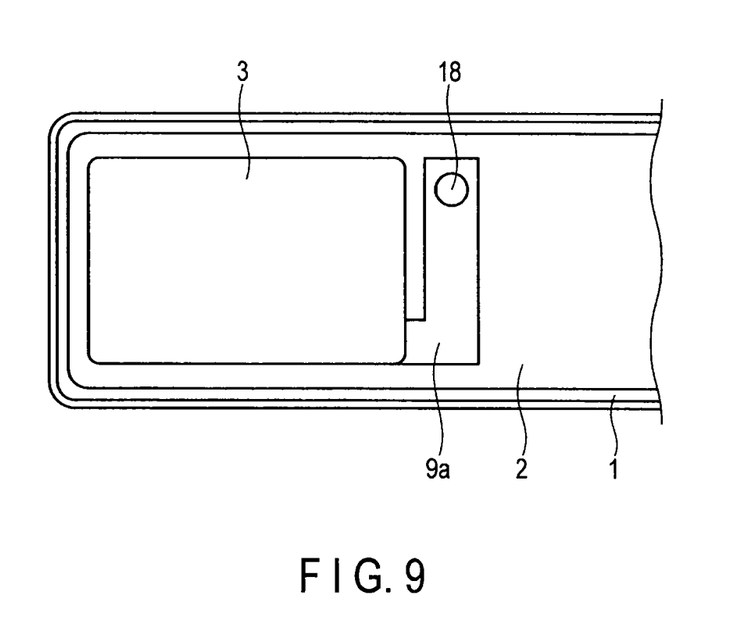
FIG. 9 is a transparent view of another battery according to the first embodiment from above.

In FIG. 5, the connecting plate 9a of the positive electrode lead 9 is extended in parallel to the long side of the sealing plate 2. However, the shape of the connecting plate 9a is not limited thereto. For example, as shown in FIG. 9, the connecting plate 9a may be perpendicularly bent, to be extended in parallel to the short side of the sealing plate 2. Since the structure can shorten the length of the connecting plate 9a of the positive electrode lead 9, the production cost of the positive electrode lead 9 can be suppressed at a low level.

In FIG. 4, the rectangle plate is used for the connecting plate 9a of the positive electrode lead 9. However, the shape of the connecting plate 9a is not limited thereto. For example, as shown in FIG. 10, a step can be formed.

Figure 10:
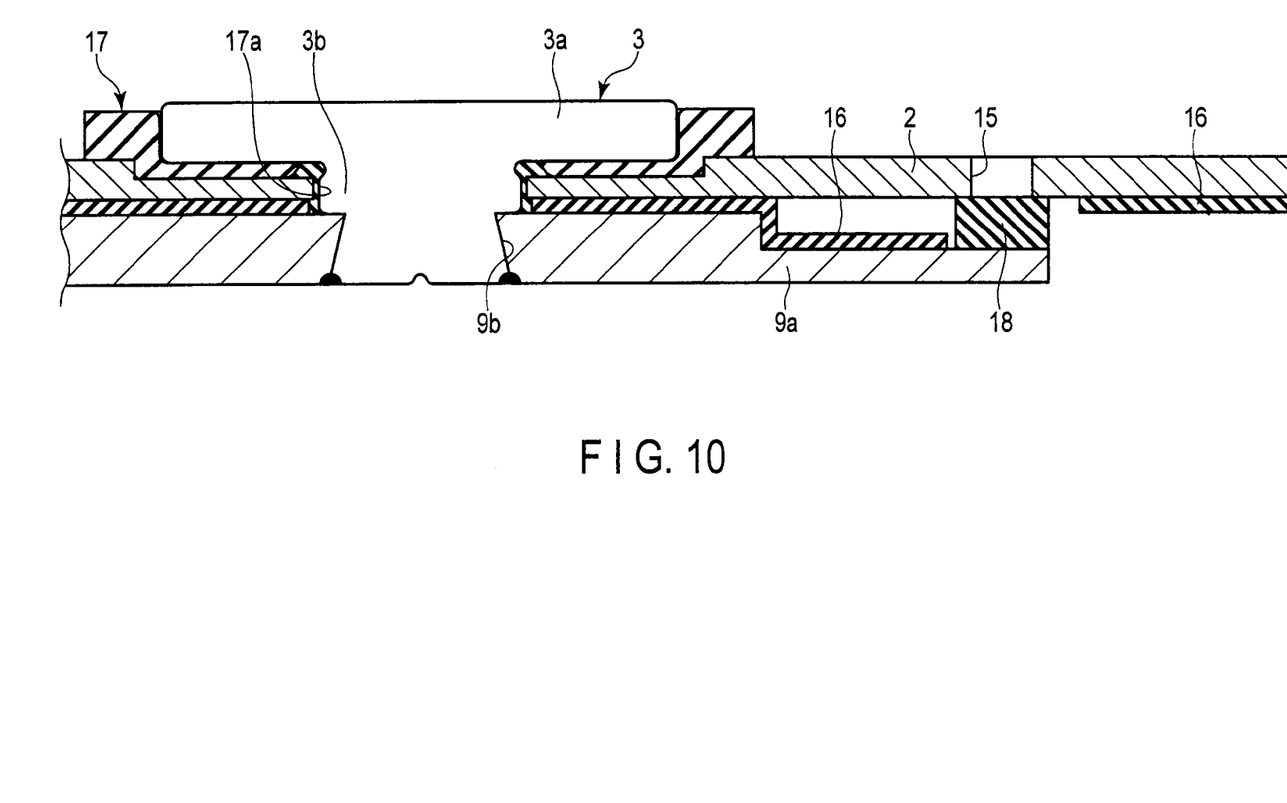
FIG. 10 is a sectional view of a positive electrode terminal, a sealing plate, and a positive electrode lead of another battery according to the first embodiment.

In FIGS. 4 and 10, the pressing member is provided on the connecting plate 9a of the positive electrode lead 9. However, the formation of the pressing member is not limited thereto. A pressing member may be provided on the connecting plate 10a of the negative electrode lead 10.

According to the first embodiment described above, the sealing plug made of an elastic material is disposed between the injecting port of the sealing plate and the pressing member of the lead. When the nonaqueous electrolytic solution is injected, the sealing plug is pressed to the lead side, to open the injecting port. Then, the nonaqueous electrolytic solution is injected from the injecting port while a pressure is applied. Since the void volume in the container can be made greater than the amount to be injected, when the container is swollen by the pressurization, the whole amount of the electrolytic solution can be injected in a short time. When a pressing force applied to the sealing plug is released after injecting, the pressing member of the lead presses the sealing plug to the sealing plate. Thereby, the container can be sealed while the pressurization state in the container is maintained. Therefore, the blowback of the electrolytic solution when the pressure applied during injecting is released can be prevented. Since the pressurization state acts in a direction where the sealing plug is pressed to the injecting port, a sealing pressure can be further enhanced. As described above, an injecting time and an impregnating time can be shortened.

Second Embodiment

A second embodiment provides a battery pack including a nonaqueous electrolyte battery. The nonaqueous electrolyte battery according to the first embodiment is used for the nonaqueous electrolyte battery. The number of the nonaqueous electrolyte batteries (unit cells) included in the battery pack can be set to one or plural number. When the battery pack is provided with the plurality of unit cells, the unit cells are electrically connected in series or in parallel.

The battery pack will be described in detail with reference to FIG. 11. A battery module 22 includes a plurality of unit cells 21. The plurality of unit cells 21 are electrically connected to each other in series. A positive electrode lead 23 is connected to a positive electrode terminal of the battery module 22. The tip of the positive electrode lead 23 is inserted into a positive electrode connector 24, to electrically connect the positive electrode lead 23 to the positive electrode connector 24. A negative electrode lead 25 is connected to a negative electrode terminal of the battery module 22. The tip of the negative electrode lead 25 is inserted into a negative electrode connector 26, to electrically connect the negative electrode lead 25 to the negative electrode connector 26. These connectors 24 and 26 are connected to a protection circuit 29 through wirings 27 and 28.

A thermistor 30 detects the temperature of the unit cell 21. The detection signal is transmitted to the protection circuit 29. The protection circuit 29 can interrupt a plus wiring 32a and a minus wiring 32b between the protection circuit 29 and a conducting terminal 31 to an external apparatus under a predetermined condition. The predetermined condition is a case where the detection temperature of the thermistor 30 is higher than a predetermined temperature, for example. The predetermined condition is a case where over charge, over discharge, and an over current or the like of the unit cell 21 are detected. The over charge or the like is detected for the each of the unit cells 21 or the battery module 21. When each of the unit cells 21 is detected, a battery voltage may be detected, or a positive electrode potential or a negative electrode potential may be detected. In the latter case, a lithium electrode used as a reference electrode is inserted into each of the unit cells 21. In the case of FIG. 6, wirings 33 configured to detect voltages are connected to the unit cells 21, to transmit the detection signal to the protection circuit 29 through the wirings 33.

Figure 11:
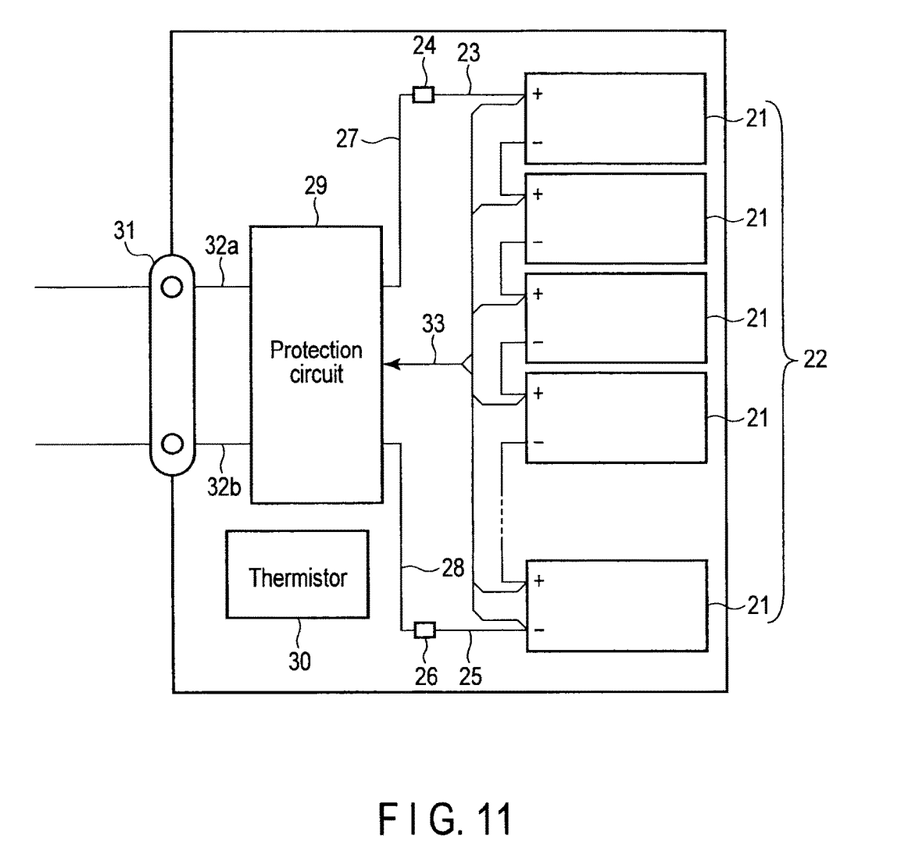
FIG. 11 is a block diagram showing an electric circuit of a battery pack according to a second embodiment.

Although the form in which the unit cells 21 are connected in series is shown in FIG. 11, the unit cells 21 may be connected in parallel in order to increase a battery capacity. The battery packs can be also connected in series and in parallel.

The embodiments of the battery pack is suitably changed depending on the application. The application of the battery pack preferably has desirable cycle characteristics in large-current. Specific examples thereof include an application for a power supply of a digital camera, and an in-vehicle application such as a two-wheeled or four-wheeled hybrid electric vehicle, a two-wheeled or four-wheeled electric vehicle, or an assistant bicycle. Particularly, the in-vehicle application is suitable.

Since the battery pack of the second embodiment described in detail includes the battery according to the first embodiment, the battery pack can shorten an injecting time and an impregnating time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery comprising:
   a container;
   an electrode group which is provided in the container and comprises a positive electrode and a negative electrode;
   an electrolytic solution which is provided in the container;
   a sealing plate which is provided in an opening part of the container;
   a terminal which is provided on the sealing plate;
   an injecting port which is opened in the sealing plate;
   a sealing plug which closes the injecting port of the sealing plate and is made of an elastic material;
   a lead which electrically connects the positive electrode or the negative electrode of the electrode group to the terminal; and
   a pressing member which is integrated with the lead and presses the sealing plug to the sealing plate,
   wherein the sealing plug is disposed between the injecting port of the sealing plate and the pressing member of the lead.

2. The battery according to claim 1,
   wherein the pressing member is made of the same material as that of the lead.

3. The battery according to claim 2,
   wherein the lead comprises a connecting plate to which the terminal is fixed, and the connecting plate serves as the pressing member.

4. The battery according to claim 2,
   wherein the pressing member is made of aluminum or an aluminium alloy.

5. A battery pack, comprising:
   one or more of the batteries according to claim 1.

6. The battery pack according to claim 5, further comprising a protection circuit.

* * * * *